US012791119B2

(12) United States Patent
Smith

(10) Patent No.: US 12,791,119 B2
(45) Date of Patent: Nov. 10, 2026

(54) OPERATOR INSERT AND RELATED SYSTEMS AND METHODS FOR IMPROVED WEAR RESISTANCE

(71) Applicant: DURASEAT LLC, Brookshire, TX (US)

(72) Inventor: Logan T. Smith, Brookshire, TX (US)

(73) Assignee: DURASEAT LLC, Brookshire, TX (US)

( * ) Notice: Subject to any disclaimer, the term of this patent is extended or adjusted under 35 U.S.C. 154(b) by 0 days.

(21) Appl. No.: 18/211,251

(22) Filed: Jun. 17, 2023

(65) Prior Publication Data

US 2023/0407986 A1 Dec. 21, 2023

Related U.S. Application Data

(60) Provisional application No. 63/353,425, filed on Jun. 17, 2022.

(51) Int. Cl.
*F16K 31/528* (2006.01)
*F16K 31/60* (2006.01)

(52) U.S. Cl.
CPC ............ *F16K 31/528* (2013.01); *F16K 31/60* (2013.01); *Y10T 74/18024* (2015.01)

(58) Field of Classification Search
CPC ............................... F16K 25/04; F16K 31/508
USPC ................... 251/215, 229, 249.5, 315.1, 366
See application file for complete search history.

(56) References Cited

U.S. PATENT DOCUMENTS

| | | | | |
|---|---|---|---|---|
| 2,200,474 | A * | 5/1940 | Heggem | F16K 5/204 251/163 |
| 2,598,187 | A | 5/1952 | Meyer | |
| 2,903,564 | A | 9/1959 | Carr | |
| 4,234,157 | A | 11/1980 | Hodgeman et al. | |
| 6,029,686 | A * | 2/2000 | Pirkle | F16K 31/56 60/527 |
| 6,164,622 | A | 12/2000 | Partridge | |

(Continued)

OTHER PUBLICATIONS

PCT Notification Of Transmittal Of The International Search Report And The Written Opinion Of The International Searching Authority, Or The Declaration, PCT/US2023/025635.

(Continued)

*Primary Examiner* — Robert K Arundale

(74) *Attorney, Agent, or Firm* — Quisenberry Law PLLC; C. Dale Quisenberry

(57) ABSTRACT

Known operator housings include a vertical groove in an internal bore adapted for engagement with a roller. Over time the groove will fail as the roller exits the groove resulting in a gouge in the internal bore. Operator housings are disclosed in which a recess is disposed in the internal bore of the operator housing. The recess is adapted to receive a removable, arcuate-shaped insert. The insert may include a groove section adapted for longitudinal alignment with the groove in the internal bore of the operator housing. The groove section will be located within the internal bore such that the roller will exit the groove section of the insert. If the roller causes damage, it will be to the insert, not to the operator housing. If such damage occurs, the damaged insert can be removed and replaced with a new insert. This avoids scrapping or refurbishing damaged operator housing.

20 Claims, 10 Drawing Sheets

(56) References Cited

U.S. PATENT DOCUMENTS

| | | | | |
|---|---|---|---|---|
| 6,276,394 | B1 * | 8/2001 | Smith | F16K 31/5284 251/56 |
| 2012/0068100 | A1 | 3/2012 | Ogawa et al. | |

OTHER PUBLICATIONS

International Search Report, PCT/US2023/025635.
Written Opinion Of The International Searching Authority, PCT/US2023/025635.

* cited by examiner

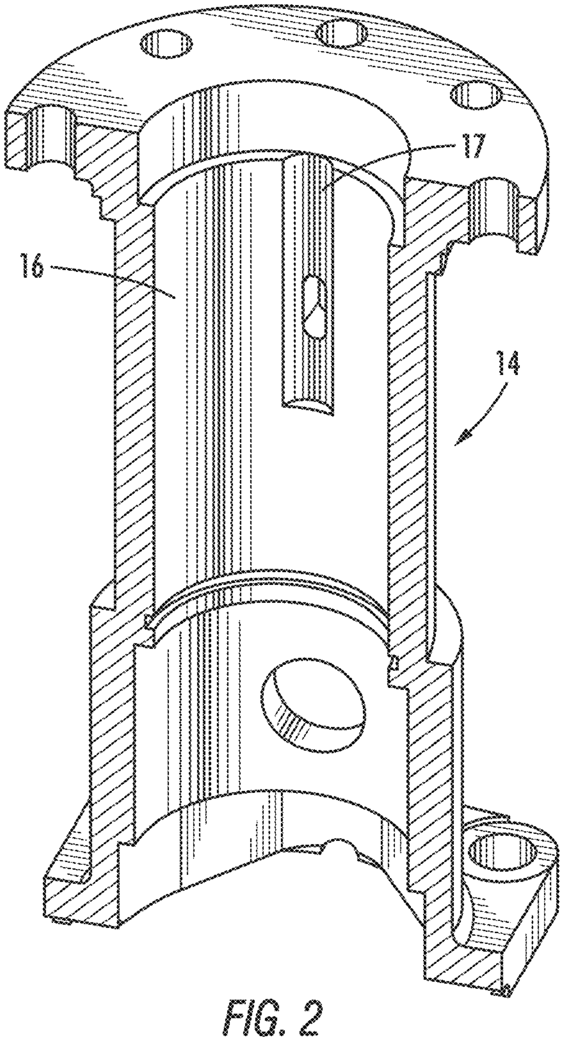
FIG. 2
( Prior Art )
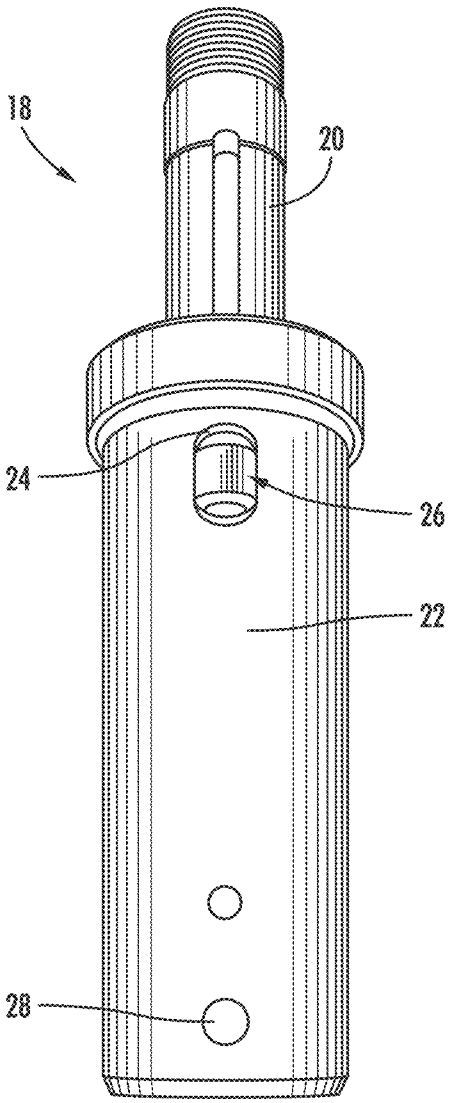
FIG. 3
FIG. 4
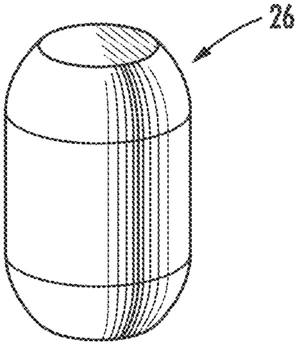

FIG. 8
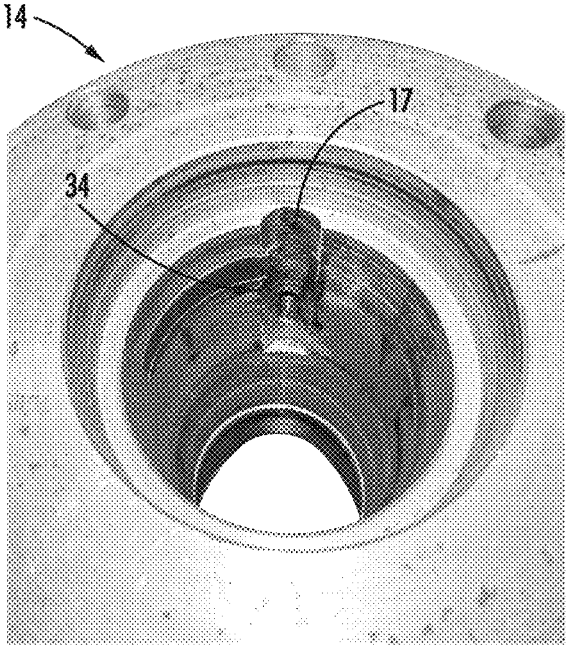
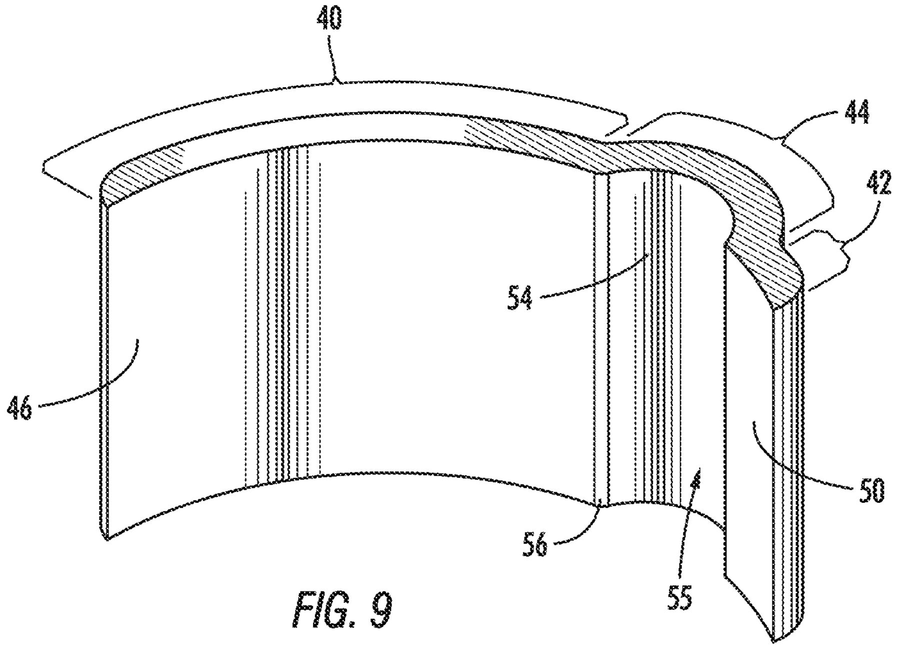
FIG. 9

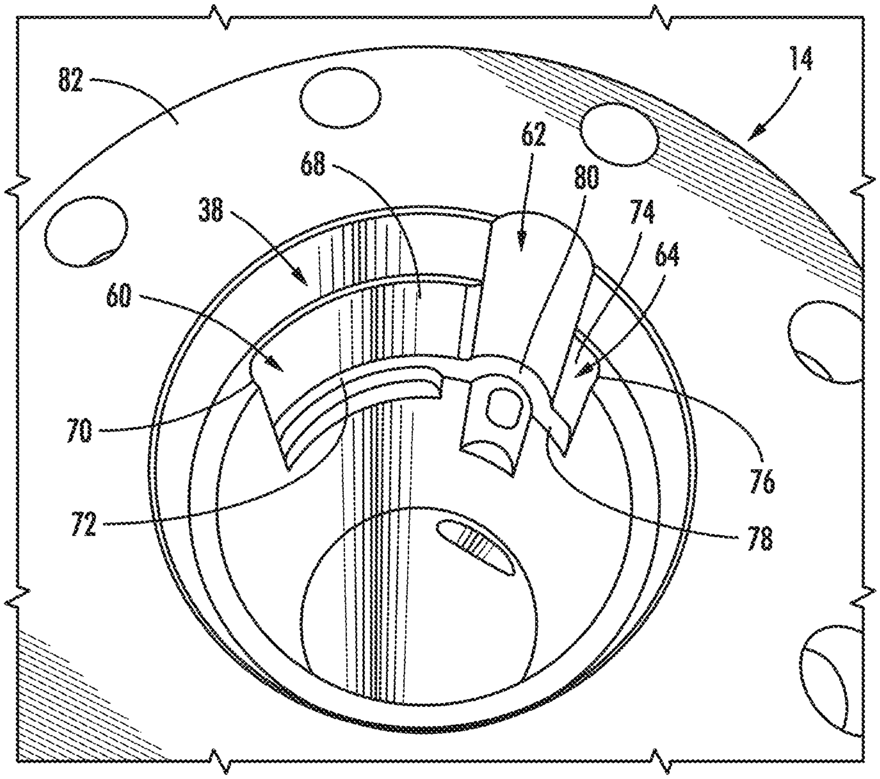
FIG. 13
FIG. 15
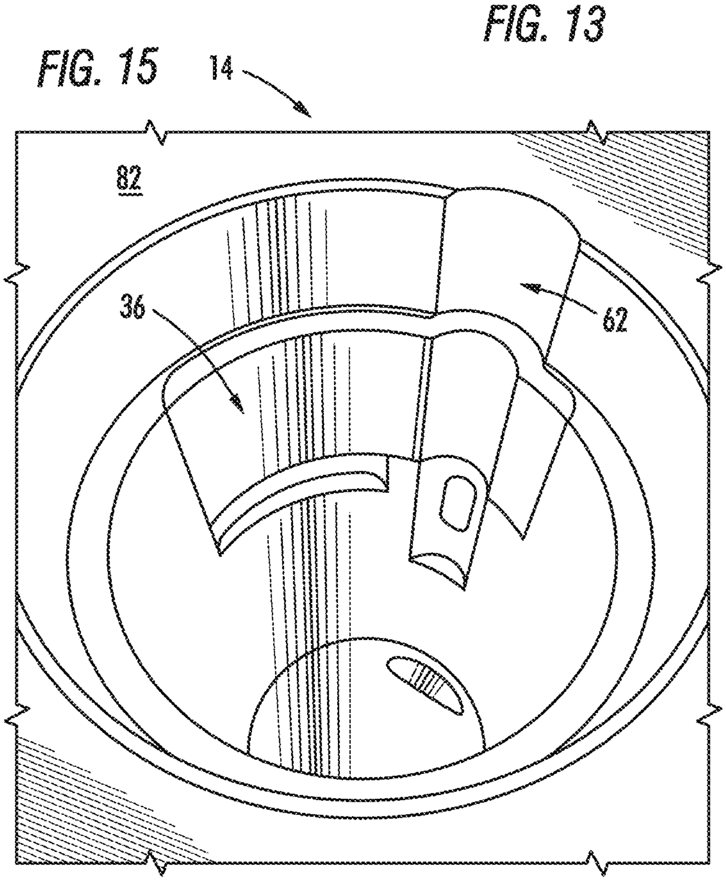

OPERATOR INSERT AND RELATED SYSTEMS AND METHODS FOR IMPROVED WEAR RESISTANCE

RELATED APPLICATIONS

This application claims the benefit of U.S. Provisional Application No. 63/353,425, filed Jun. 17, 2022, the contents of which are fully incorporated herein by reference.

BACKGROUND OF THE INVENTIONS

1. Field of the Inventions

The present inventions generally pertain to valve equipment, and more particularly to improved designs to prolong the life of operators that are used to actuate valves.

2. Description of the Related Art

The use of valves to control fluid flow through conduits in the oil and gas industry is well known. It is also well known that valves typically include an operator assembly, often including a hand wheel, that is used to open and close the valve. Operator assemblies used to open and close double block and bleed expanding plug valves typically include a stem assembly including an upper and lower stem that are releasably engaged rotationally with each other through the use of a roller. In operation, the upper stem has a roller pocket on its outer surface that is adapted for engagement with the roller, which is retained within a window in the lower stem. When the upper stem and lower stem are not engaged to each other, the roller will be positioned within the window in the lower stem and a generally vertical, longitudinal groove in an operator housing, thereby securing the lower stem rotationally to the operator housing when in this position. When the upper stem is rotated within the lower stem, as the roller pocket on the outside of the upper stem moves past the window in the lower stem the roller will move out of the longitudinal groove in the operator housing and into the roller pocket on the outside of the upper stem. A known problem with existing operator assemblies is that the inner bore of the operator housing will experience metallurgical failure over time as the roller is transitioning from engagement with the longitudinal groove in the operator housing into engagement with the roller pocket on the outer surface of the upper stem. An example of such metal failure occurs when the roller simply gouges a groove into the inner bore of the operator housing instead of moving into engagement with the roller pocket on the upper stem.

The present inventions have been conceived and developed to address the above-described problem and provide a solution thereto. The manner in which the present inventions achieve these objectives will become apparent from the following descriptions and explanations provided below.

SUMMARY OF THE INVENTIONS

In one aspect, the present inventions may encompass an insert for an operator housing comprising: a first arcuate section, a second arcuate section, and a groove section disposed between the first arcuate section and the second arcuate section, the first arcuate section including a first inner surface defined by a first inner radius $R_1$, and a first outer surface defined by a first outer radius $R_2$, the first arcuate section defining a generally curved wall having a thickness equal to the difference between $R_1$ and $R_2$; the second arcuate section including a second inner surface defined by a second inner radius $R_4$, and a second outer surface having a second outer radius $R_5$, the second arcuate section defining a generally curved wall having a thickness equal to the difference between $R_4$ and $R_5$; and the groove section including a third inner surface defined by a third inner radius $R_7$, the third inner surface defining a concave trough, a left side of the groove transitioning into a right side of the first inner surface on the first arcuate section at a first transition, a right side of the groove transitioning into a left side of the second inner surface of the second arcuate section, the groove section including a third outer surface defined by a third outer radius $R_9$, the groove section defining a generally curved wall having a thickness equal to the difference between $R_7$ and $R_9$, a left side of the third outer surface transitioning into a right side of the first outer surface on the first arcuate section, and a right side of the third outer surface transitioning into a left side of the second outer surface on the second arcuate section. Another feature of this aspect of the present inventions may be that a first end of the first arcuate section is rounded, and a second end of the second arcuate section is rounded.

In another aspect, the present inventions may encompass an operator housing comprising: a body member having an internal bore, a recess in the internal bore, and a top flange, the recess including a first arcuate recess, a groove recess, a second arcuate recess, and a lower relief access 66, the first arcuate recess including a first arcuate wall and a first end wall, the first arcuate wall 68 being defined by a radius $R_{10}$ and a first arcuate floor surface, the second arcuate recess including a second arcuate wall and a second end wall, the second arcuate wall being defined by a radius $R_{12}$ and a second arcuate floor surface, the groove recess extending from a groove floor surface of the groove recess to an upper surface of the top flange, the first arcuate floor surface, the second arcuate floor surface, and the groove floor surface defining an insert recess floor surface. Another feature of this aspect of the present inventions may be that the groove recess is a generally vertical, longitudinal concave trough. Another feature of this aspect of the present inventions may be that the recess further includes a lower relief access disposed in the internal bore beneath the first arcuate recess. Another feature of this aspect of the present inventions may be that a lower portion of the longitudinal groove may be disposed beneath the groove floor surface, and be vertically aligned with the groove recess.

In another aspect, the present inventions may include an insert for an operator housing comprising: a first arcuate section, a second arcuate section, and a groove section disposed between the first arcuate section and the second arcuate section, the first arcuate section including a first inner surface defined by a first inner radius $R_1$, and a first outer surface defined by a first outer radius $R_2$, the first arcuate section defining a generally curved wall having a thickness equal to the difference between $R_1$ and $R_2$, the second arcuate section including a second inner surface defined by a second inner radius $R_4$, and a second outer surface having a second outer radius $R_5$, the second arcuate section defining a generally curved wall having a thickness equal to the difference between $R_4$ and $R_5$, and the groove section including a third inner surface defined by a third inner radius $R_7$, the third inner surface defining a concave trough, a left side of the concave trough transitioning into a right side of the first inner surface on the first arcuate section at a first transition, a right side of the concave trough transitioning into a left side of the second inner surface of the second arcuate section, the groove section including a third outer surface defined by a third outer radius $R_9$, the groove section defining a generally curved wall having a thickness equal to the difference between $R_7$ and $R_9$, a left side of the third outer surface transitioning into a right side of the first outer surface on the first arcuate section, and a right side of the third outer surface transitioning into a left side of the second outer surface on the second arcuate section. Another feature of this aspect of the present inventions may be that a first end of the first arcuate section is rounded, and a second end of the second arcuate section is rounded. Another feature of this aspect of the present inventions may be that the operator housing is formed from a ductile iron having a first hardness, and the insert is formed from a tool steel having a second hardness, the second hardness being greater than the first hardness. Another feature of this aspect of the present inventions may be that the insert is formed from a tool steel having a hardness in a range from approximately 40 to 55 HRC. Another feature of this aspect of the present inventions may be that the concave trough is adapted for alignment with a longitudinal groove in an inner bore of the operator housing. Another feature of this aspect of the present inventions may be that the insert is adapted for removable engagement with a recess in an inner bore of the operator housing.

In yet another aspect, the present inventions may include an operator housing comprising: a body member having an internal bore, a recess in the internal bore, and a top flange, the recess including a first arcuate recess, a groove recess, and a second arcuate recess, the first arcuate recess including a first arcuate wall and a first end wall, the first arcuate wall being defined by a radius $R_{10}$ and a first arcuate floor surface, the second arcuate recess including a second arcuate wall and a second end wall, the second arcuate wall being defined by a radius $R_{12}$ and a second arcuate floor surface, the groove recess extending from a groove floor surface of the groove recess to an upper surface of the top flange, and the first arcuate floor surface, the second arcuate floor surface, and the groove floor surface defining an insert recess floor surface. Another feature of this aspect of the present inventions may be that the groove recess is a generally vertical, longitudinal concave trough. Another feature of this aspect of the present inventions may be that the recess further includes a lower relief access disposed in the internal bore beneath the first arcuate recess. Another feature of this aspect of the present inventions may be that a lower portion of a longitudinal groove in the internal bore of the body member is disposed beneath the groove floor surface, and vertically aligned with the groove recess. Another feature of this aspect of the present inventions may be that the operator housing may further include an insert having a shape corresponding to a shape of the recess. Another feature of this aspect of the present inventions may be that the operator housing is formed from a ductile iron having a first hardness, and the insert is formed from a tool steel having a second hardness, the second hardness being greater than the first hardness. Another feature of this aspect of the present inventions may be that the insert is formed from a tool steel having a hardness in a range from approximately 40 to 55 HRC.

In still another aspect, the present inventions may include an operator housing comprising: a body member having an internal bore, a recess in the internal bore, a longitudinal groove in the internal bore, and a top flange, and an insert adapted for mating engagement with the recess, the recess including a first arcuate recess, a groove recess, and a second arcuate recess, the first arcuate recess including a first arcuate wall and a first end wall, the first arcuate wall being defined by a first radius $R_{10}$ and a first arcuate floor surface, the second arcuate recess including a second arcuate wall and a second end wall, the second arcuate wall being defined by a second radius $R_{12}$ and a second arcuate floor surface, the groove recess extending upwardly from a groove floor surface of the groove recess toward the top flange, and the first arcuate floor surface, the second arcuate floor surface, and the groove floor surface defining an insert recess floor surface. Another feature of this aspect of the present inventions may be that the insert includes a first arcuate section, a second arcuate section, and a groove section disposed between the first arcuate section and the second arcuate section, the first arcuate section being adapted for mating engagement with the first arcuate recess, the second arcuate section being adapted for mating engagement with the second arcuate recess, and the groove section being adapted for mating engagement with the groove recess. Another feature of this aspect of the present inventions may be that a radius of the first arcuate recess is greater than a radius of the first arcuate section, a radius of the second arcuate recess is greater than a radius of the second arcuate section, and a radius of the groove recess is greater than a radius of the groove section. Another feature of this aspect of the present inventions may be that each of the first arcuate wall and the second arcuate wall has a height corresponding to a height of the insert. Another feature of this aspect of the present inventions may be that the recess further includes a lower relief access disposed in the internal bore beneath the first arcuate recess. Another feature of this aspect of the present inventions may be that the a lower portion of the longitudinal groove is disposed beneath the groove floor surface and vertically aligned with the groove recess. Another feature of this aspect of the present inventions may be that the operator housing is formed from a ductile iron having a first hardness, and the insert is formed from a tool steel having a second hardness, the second hardness being greater than the first hardness.

Other features, aspects and advantages of the present inventions will become apparent from the following discussion and detailed description.

BRIEF DESCRIPTION OF THE DRAWINGS

FIG. 2 is a perspective view of a portion of an operator housing and showing an internal bore thereof.

FIG. 3 is a perspective view of a stem assembly including an upper stem and a lower stem.

FIG. 4 is a perspective view of a roller to be received within a window in the lower stem.

FIG. 8 is a photograph showing an example of how the roller gouged a groove in the inner bore of the operator housing.

FIG. 9 is a perspective view of a specific embodiment of an insert constructed in accordance with the present inventions.

FIG. 13 is perspective view similar to FIG. 12.

FIG. 15 is a perspective view similar to FIG. 13, but now showing an insert positioned within the recess.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

Figure 1:
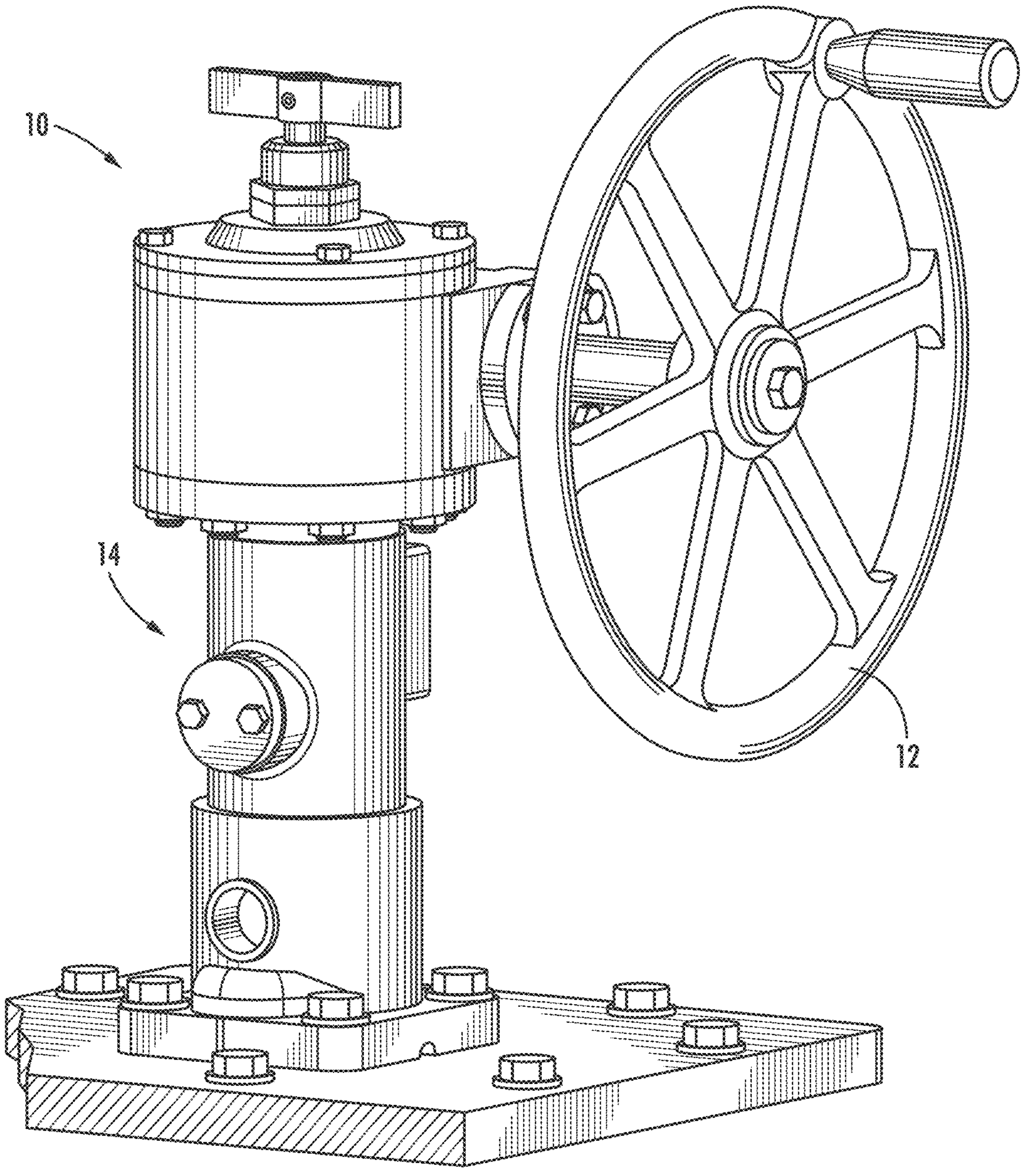
FIG. 1 is a perspective view of an operator assembly including an operator housing of the type currently in use in connection with double block and bleed expanding plug valves.

As mentioned above, the present inventions are directed to improvements to operators that are used to actuate double block and bleed expanding plug valves. Before describing the present inventions, the general structure and operation of the current state of the art for such operators will first be described. Referring to FIG. 1, a typical operator assembly 10 of the type in use today with double block and bleed expanding plug valves is shown. The operator assembly 10 includes a hand wheel 12 and an operator housing 14. FIG. 2 is a perspective view of a portion of the operator housing 14 and showing an internal bore 16 thereof. FIG. 2 also shows that the bore 16 includes a generally vertical, longitudinal groove 17. FIG. 3 is a perspective view of a stem assembly 18 that includes an upper stem 20 and a lower stem 22. The stem assembly 18 is adapted to be received within the bore 16 of the operator housing 14, as will be discussed in more detail below. The upper stem 20 is engaged with the hand wheel 12 via a worm gear in a known manner, such that rotation of the hand wheel 12 causes rotation of the upper stem 20. It is noted that the upper stem 20 does not move up and down; it only rotates. The lower stem 22 includes a window 24 adapted for receiving a roller 26. A perspective view of the roller 26 is shown in FIG. 4. A lower end of the lower stem 22 includes an aperture 28 adapted for connection to a trunnion (not shown) that is connected to a plug (not shown), as will be understood by those of ordinary skill in the art.

Figure 5:
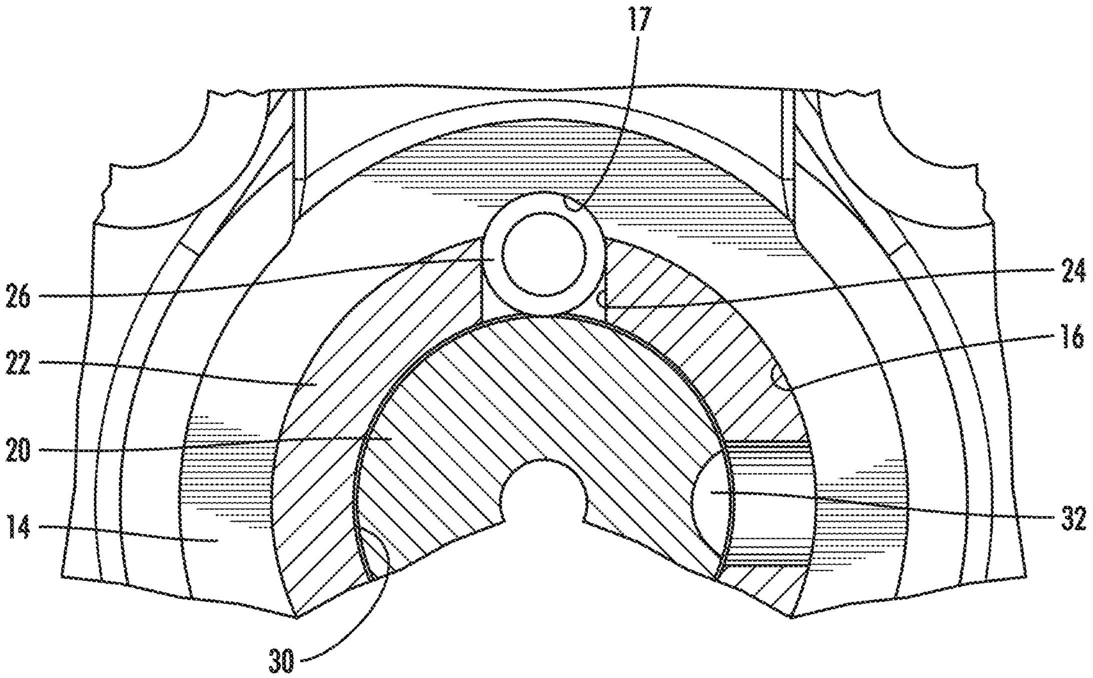
FIG. 5 ( Prior Art )
FIG. 5 is a cross-sectional top view horizontally through the operator housing, the upper stem, and the lower stem when the stem assembly is mounted within the bore of the operator housing.

Referring now to FIG. 5, there is shown a cross-sectional view horizontally through the operator housing 14, the upper stem 20, the lower stem 22, and the roller 26, when the stem assembly 18 is mounted within the bore 16 of the operator housing 14. It can be seen from FIG. 5 that the lower stem 22 is a cylindrical member having an inner bore 30, and the upper stem 20 is disposed within the inner bore 30 of the lower stem 22. FIG. 5 also shows that an outer surface of the upper stem 20 includes a roller pocket 32. As discussed below, it will be seen that the roller pocket 32 is adapted to receive a portion of the roller 26 and rotationally engage the lower stem 22 to the upper stem 20. But in the view shown in FIG. 5, the roller pocket 32 and roller 26 are not engaged, meaning that, in this view, the upper stem 20 is not rotationally engaged with the lower stem 22. FIG. 5 also illustrates that, in the position shown in FIG. 5, the roller 26 is partially engaged with the longitudinal groove 17 in the operator housing 14. Also in the position shown in FIG. 5, the expanding plug valve (not shown) is in its closed position, as will be understood by those of ordinary skill in the art.

When it is desired to open the plug valve (not shown), the hand wheel 12 is rotated, which will initially cause the upper stem 20 to rotate in a counterclockwise direction and move the lower stem 22 (and attached trunnion which is not shown) upwardly to retract slip members (not shown) on the plug (not shown), as will be readily understood to those of ordinary skill in the art. During this time of upward vertical movement, the roller pocket 32 in the outer surface of the upper stem 20 is being rotated counterclockwise toward the roller 26 and the roller 26 is moving upwardly along the longitudinal groove 17 in the inner bore 16 of the operator housing 14.

Figure 6:
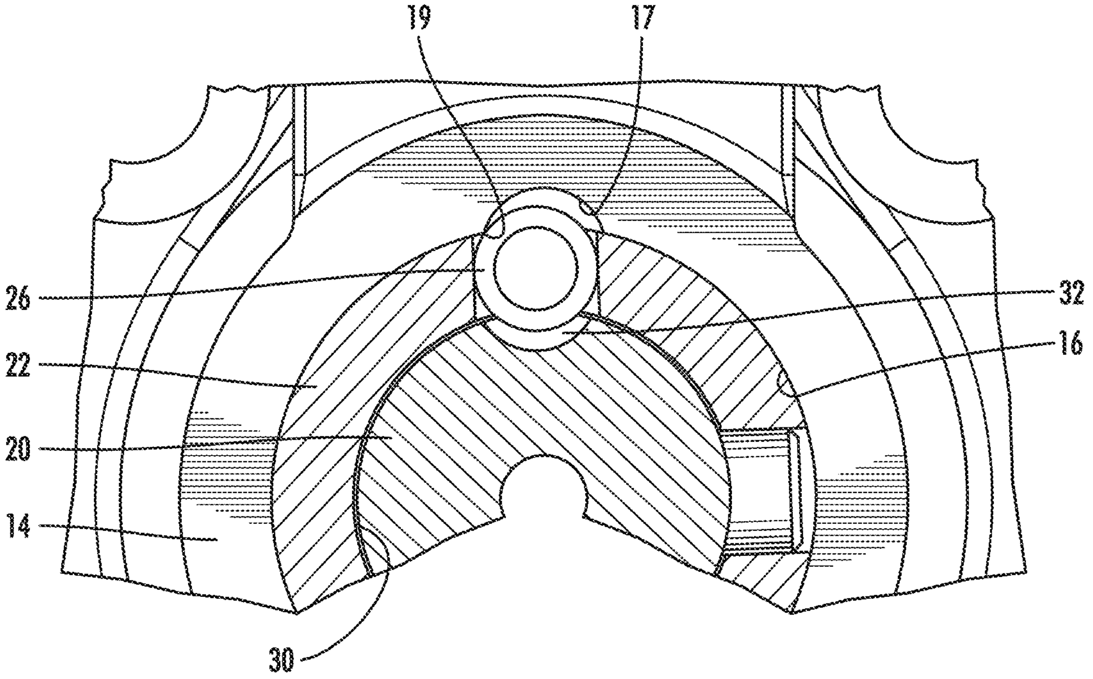
FIG. 6 ( Prior Art )
FIG. 6 is a cross-sectional top view similar to FIG. 5, but showing a roller pocket on an outer surface of the upper stem after having been rotated in a counterclockwise direction into alignment with the roller.
Figure 7:
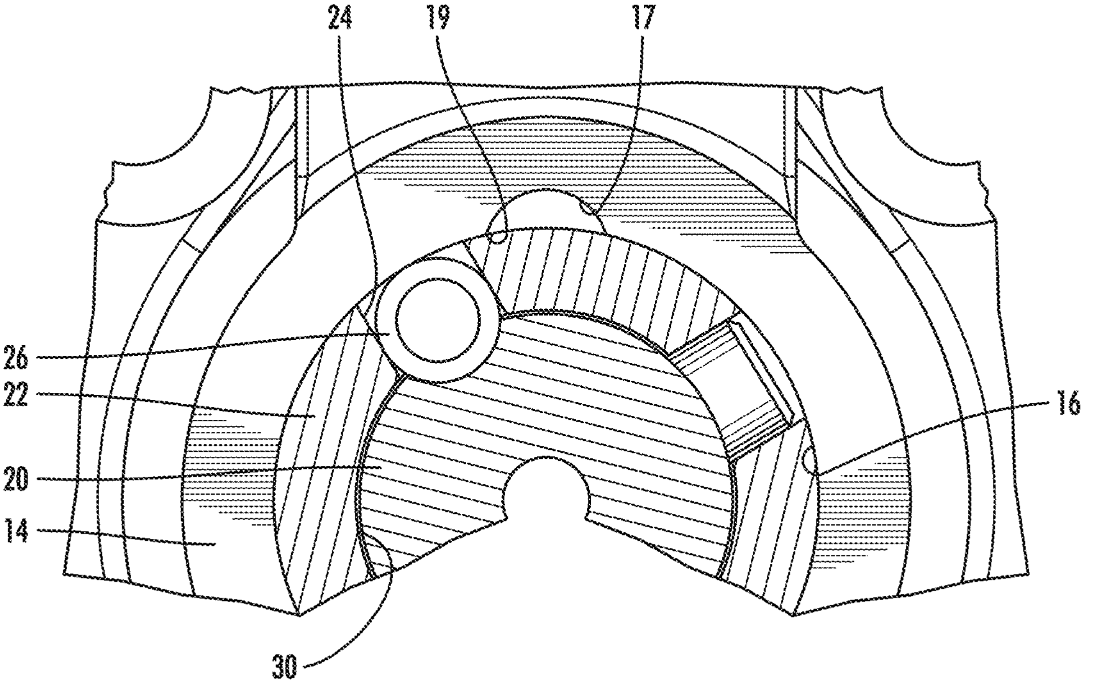
FIG. 7 ( Prior Art )
FIG. 7 is a cross-sectional top view similar to FIGS. 5 and 6, but showing the upper and lower stems engaged with one another by virtue of the roller being engaged with the roller pocket.

Referring now to FIG. 6, the roller pocket 32 in the outer surface of the upper stem 20 has been rotated approximately 90 degrees in a counterclockwise direction so that the roller pocket 32 is coming into alignment with the window 24 in the lower stem 22 and the roller 26 contained therein. As the roller pocket 32 comes into alignment with the roller 26 and continues to move in a counterclockwise direction, the roller 26 will engage with the roller pocket 32 and ride up or across a trailing edge 19 of the longitudinal groove 17 until the roller 26 becomes fully engaged with the roller pocket 32 and contained by the roller pocket 32, the window 24, and the inner bore 16, as shown in FIG. 7. This results in the upper stem 20 being rotationally engaged with the lower stem 22 so that rotation of the upper stem 20 by the hand wheel 12 also causes rotation of the lower stem 22 (and the trunnion and plug (not shown)).

The present inventions have been developed to address a problem that is known to occur when the roller 26 transitions out of engagement between the lower stem 22 and operator housing 14 and into engagement between the lower stem 22 and the upper stem 20. In particular, it is known that movement of the roller 26 from the longitudinal groove 17 in the inner bore 16 of the operator housing 14 during this transition process causes severe wear along the trailing edge 19 of the longitudinal groove 17 and eventual failure pursuant to which the roller 26 will gouge a groove into the inner bore 16 of the operator housing 14. An example of such a gouged groove 34 is shown in the photograph included as FIG. 8. In this example, the operator housing 14 failed after only 20 cycles. This results in costly downtime and repair. The reason for this failure is that the operator housing 14 is typically made from unhardened material, such as in the range of 17 HRC, also known as Rockwell hardness rating. It is not an option to address this problem by simply hardening the entire operator housing 14 due to various manufacturing/engineering challenges.

Figure 10:
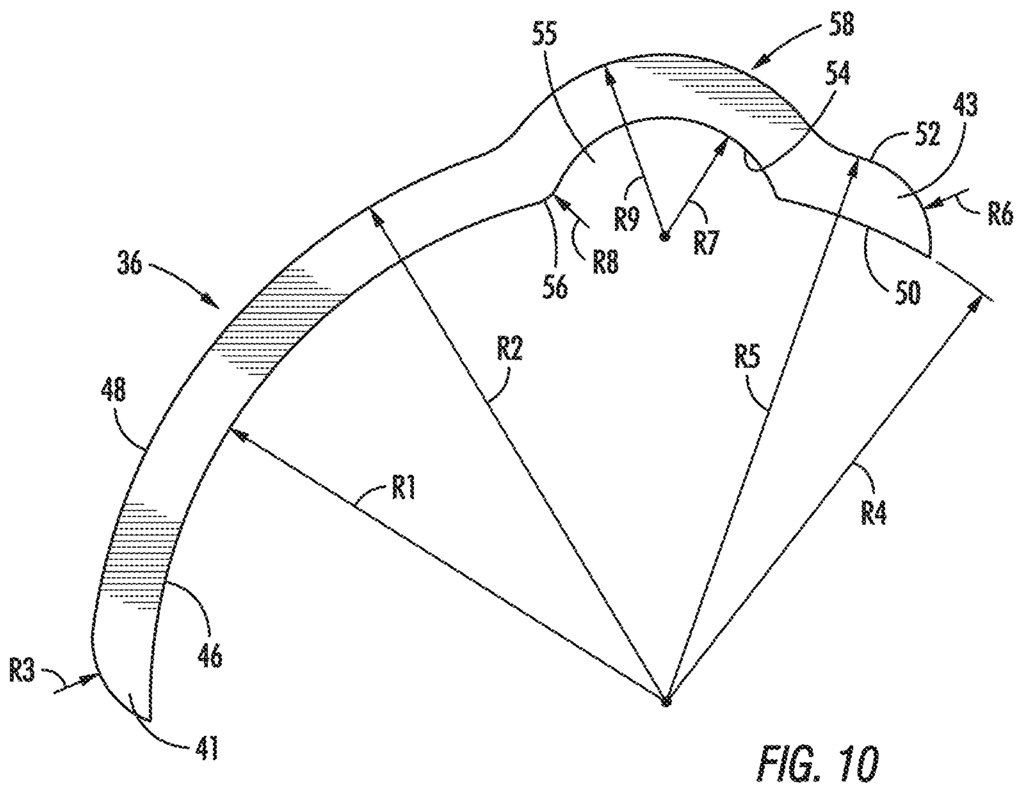
FIG. 10 is a top view of the insert shown in FIG. 9.
Figure 11:
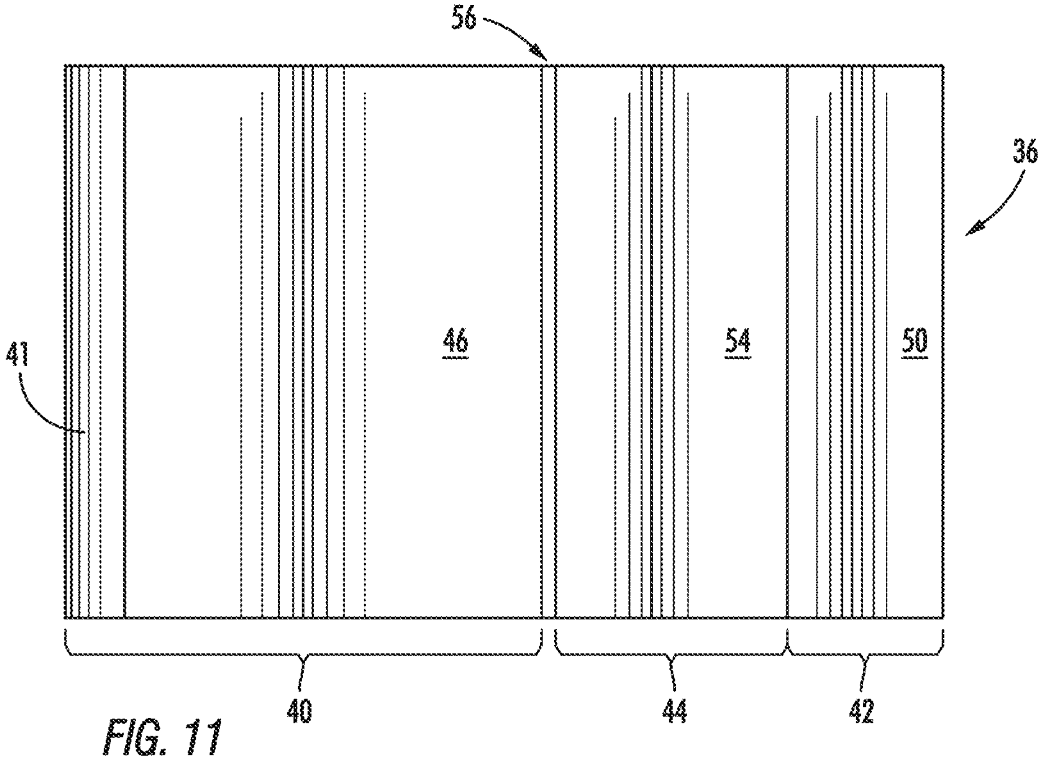
FIG. 11 is a front view of the insert shown in FIGS. 9 and 10.
Figure 14:
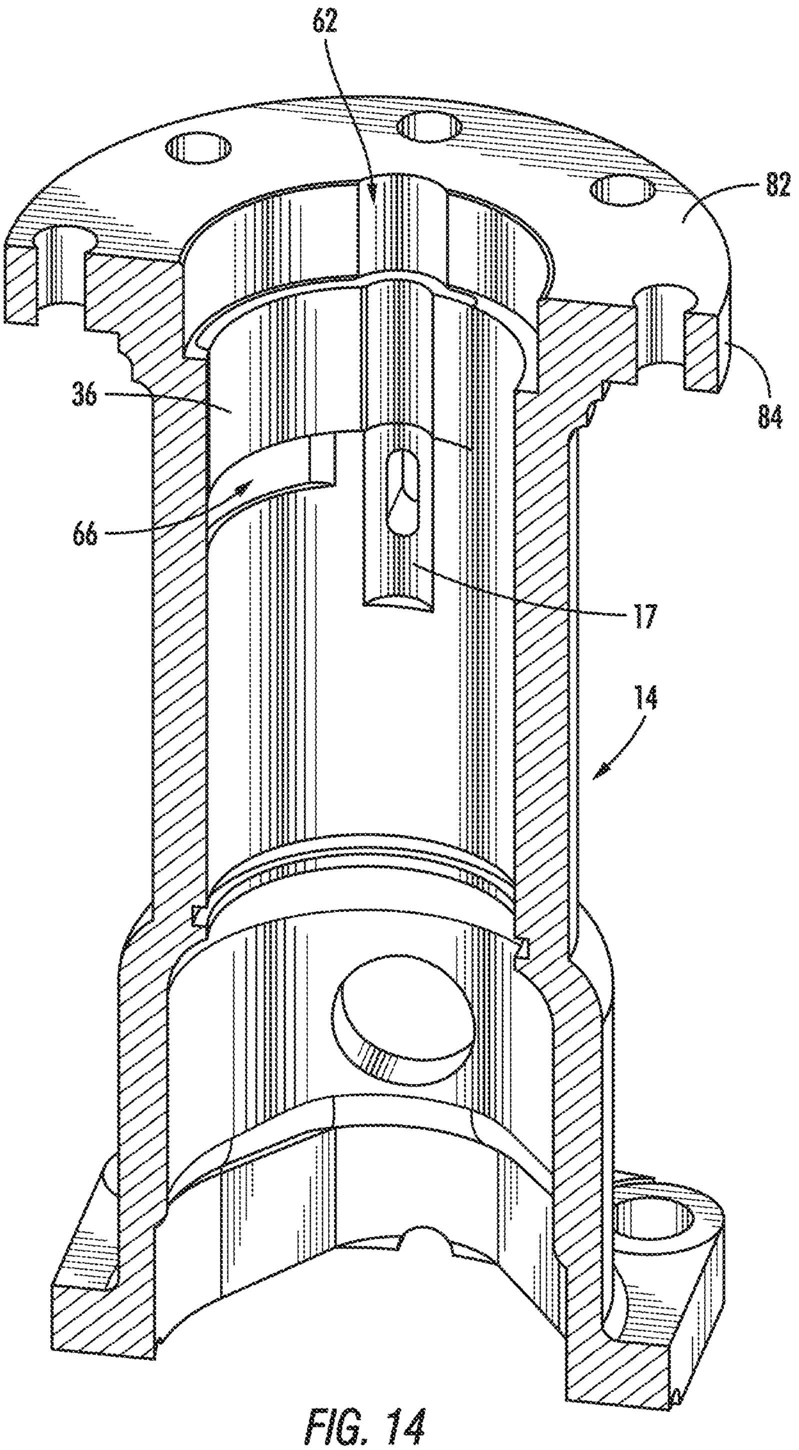
FIG. 14 is a perspective view similar to FIG. 12, but now showing an insert positioned within the recess.

The present inventions have addressed this problem by developing an insert 36, a specific embodiment of which is shown in FIGS. 9, 10 and 11. In a specific embodiment, the insert 36 may be made from tool steel that has a hardness greater than the hardness of the ductile iron from which the operator housing 14 is made. In a specific embodiment, the insert 36 may be made from tool steel having a hardness in a range from approximately 40 to 55 HRC. The present inventions further provide that a recess 38 is machined into the inner bore 16 of the operator housing 14, as shown for example in FIGS. 12 and 13. In a specific embodiment, the recess 38 is in the shape of the insert 36. FIGS. 14 and 15 show the insert 36 positioned within the recess 38. Testing has shown that use of the present inventions have been successfully employed to increase cycle life to over 200 cycles, and in some tests the present inventions have been successfully employed to increase cycle life to over 400 cycles. Considering the six specimens that have been tested, the present inventions produce a cycle life 11 times greater on average than typical cycle life for currently available operator housings.

In a specific embodiment, the insert 36 may include a generally arc-shaped body member having a first arcuate section 40, a second arcuate section 42, and a groove section 44 disposed between the first arcuate section 40 and the second arcuate section 42.

In a specific embodiment, the first arcuate section 40 may include a first inner surface 46 defined by a first inner radius $R_1$. In a specific embodiment, the first arcuate section 40 may include a first outer surface 48 defined by a first outer radius $R_2$. As such, in a specific embodiment, the first arcuate section 40 may define a generally curved wall having a thickness equal to the difference between $R_1$ and $R_2$. In a specific embodiment, the first arcuate section 40 may include a first end 41 that may be rounded, and may have a radius $R_3$. In other specific embodiments, the first end 41 may also be defined by other shapes or configurations, such as squared or angled, for example.

Similarly, in a specific embodiment, the second arcuate section 42 may include a second inner surface 50 having a radius $R_4$ corresponding to radius $R_1$ and a second outer surface 52 having a radius $R_5$ corresponding to radius $R_2$. The second arcuate section 42 may similarly define a generally curved wall having a thickness equal to the difference between $R_4$ and $R_5$. In a specific embodiment, the second arcuate section 42 may include a second end 43 that may be rounded, and may have a radius $R_6$ corresponding to $R_3$. In other specific embodiments, the second end 43 may also be defined by other shapes or configurations, such as squared or angled, for example.

As mentioned above, the groove section 44 is disposed between the first and second arcuate sections 40 and 42. In a specific embodiment, the groove section 44 may include a third inner surface 54 defined by a third inner radius $R_7$. In a specific embodiment, the third inner surface 54 of the groove section 44 may define a concave trough or groove 55 that will function to partially replace the longitudinal groove 17 in the inner bore 16 as discussed above. A left side of the groove 55 meets and transitions into a right side of the first inner surface 46 on the first arcuate section 40 at a first transition 56. In a specific embodiment, the first transition 56 may define a rounded edge defined by a first transition radius $R_8$. A right side of the groove 55 meets and transitions into a left side of the second inner surface 50 of the second arcuate section 42. In a specific embodiment, the groove section 44 may include a third outer surface 58 that may be defined by a third outer radius $R_9$. As such, in a specific embodiment, the groove section 44 may define a generally curved wall having a thickness equal to the difference between $R_7$ and $R_9$. A left side of the third outer surface 58 meets and transitions into a right side of the first outer surface 48 on the first arcuate section 40. A right side of the third outer surface 58 meets and transitions into a left side of the second outer surface 52 on the second arcuate section 42.

Figure 12:
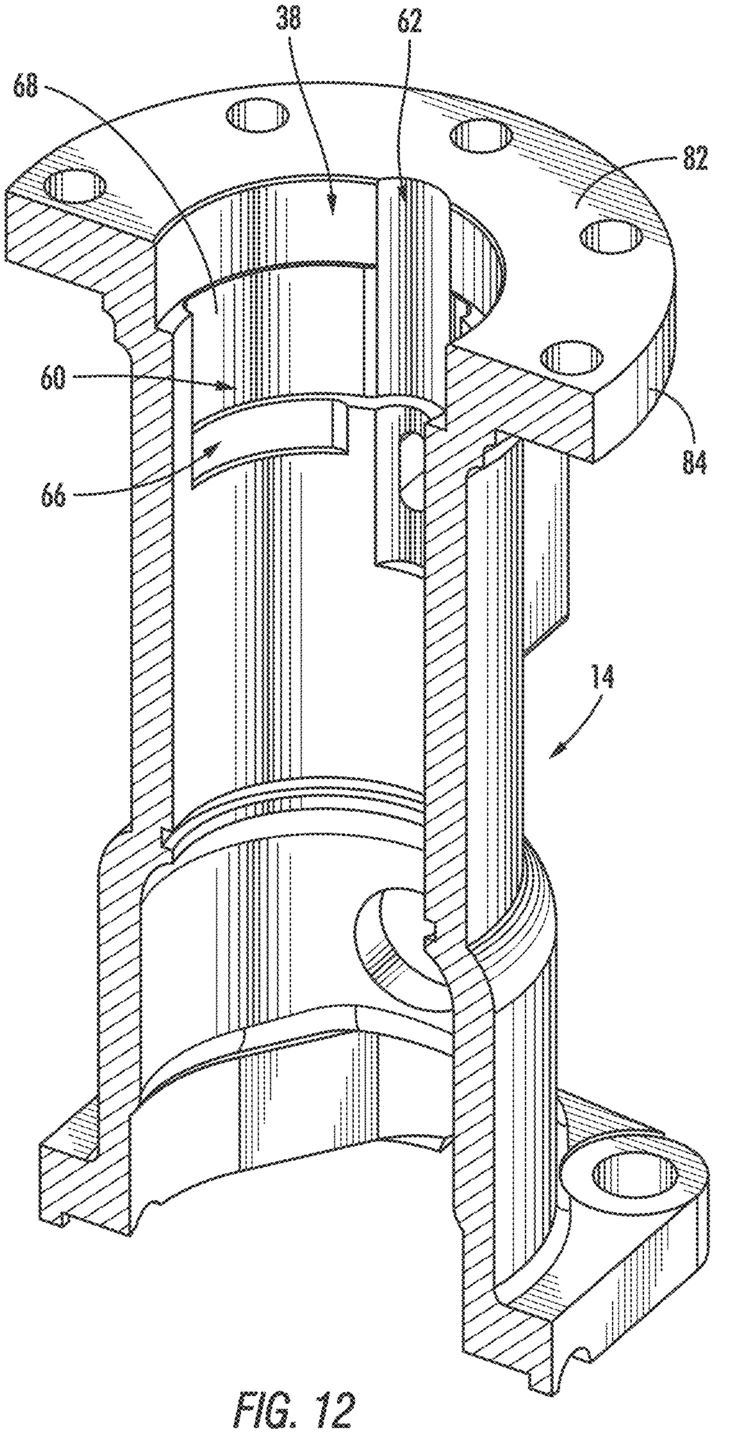
FIG. 12 is a perspective view of a specific embodiment of an operator housing constructed in accordance with the present inventions, and illustrating a recess machined into the inner bore of the operator housing and adapted to receive an insert, such as those shown in FIGS. 9-11.

As mentioned above, the insert 36 is adapted for engagement within the recess 38 in the inner bore 16 of the operator housing 14. With reference to FIGS. 12 and 13, it can be seen that, in a specific embodiment, the recess 38 may include a first arcuate recess 60, a groove recess 62, and a second arcuate recess 64. In a specific embodiment, the recess 38 may further include a lower relief access 66. In a specific embodiment, the groove recess 62 may be a generally vertical, longitudinal concave trough or groove.

Figure 16:
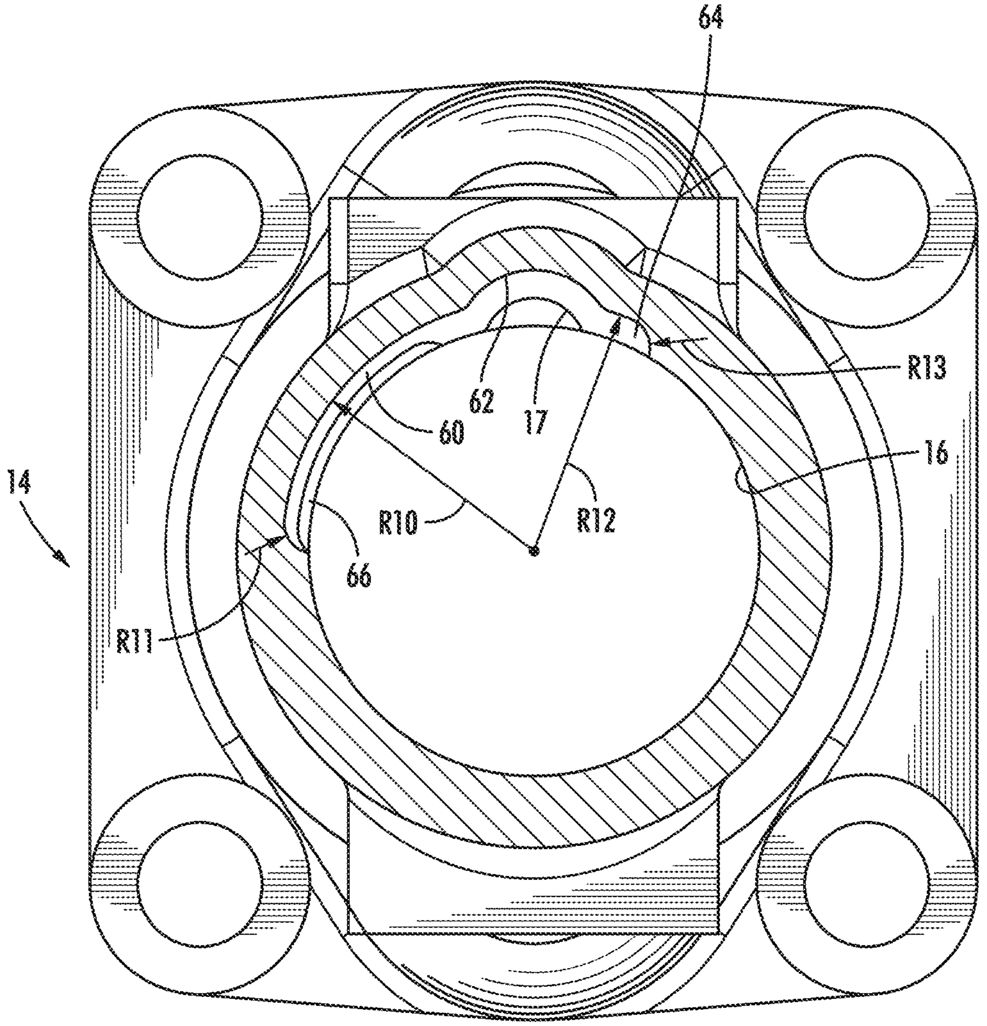
FIG. 16 is a top cross-sectional view showing the recess, such as shown in FIG. 12.

The first arcuate recess 60 may include a first arcuate wall 68 and a first end wall 70. In a specific embodiment, as shown in FIG. 16, the first arcuate wall 68 may be defined by a radius $R_{10}$ corresponding to the first outer radius $R_2$ on the first arcuate section 40 of the insert 36. In a specific embodiment, the radius $R_{10}$ of the first arcuate wall 68 may be 0.001 inches greater than the first outer radius $R_2$. In a specific embodiment, the first end wall 70 may be rounded and be defined by a radius $R_{11}$ and corresponding to the radius $R_3$ on the first end 41 of the first arcuate section 40 of the insert 36. In a specific embodiment, the radius $R_{11}$ of the first end wall 70 may be 0.001 inches greater than the radius $R_3$ on the first end 41 of the first arcuate section 40 of the insert 36. The first arcuate recess 60 may further be defined by a first arcuate floor surface or ledge 72 adapted to support and conform to a lower surface of the first arcuate section 40 of the insert 36.

The second arcuate recess 64 may include a second arcuate wall 74 and a second end wall 76. In a specific embodiment, the second arcuate wall 74 may be defined by a radius Rig corresponding to the radius $R_5$ on the second arcuate section 42 of the insert 36. In a specific embodiment, the radius $R_{12}$ of the second arcuate wall 74 may be 0.001 inches greater than the radius $R_5$. In a specific embodiment, the second end wall 76 may be rounded and be defined by a radius $R_{13}$ corresponding to the radius $R_6$ on the second end 43 of the second arcuate section 42 of the insert 36. In a specific embodiment, the radius $R_{13}$ of the second end wall 76 may be 0.001 inches greater than the radius $R_6$ on the second end 43 of the second arcuate section 42 of the insert 36. The second arcuate recess 64 may further be defined by an arcuate floor surface or ledge 78 adapted to support and conform to a lower surface of the second arcuate section 42 of the insert 36.

In a specific embodiment, each of the first arcuate wall 68 and the second arcuate wall 74 may have a height corresponding to a height of the insert 36. In a specific embodiment, however, the groove recess 62 may extend from a groove floor surface 80 of the groove recess 62 to an upper surface 82 of a top flange 84 of the operator housing 14. The first arcuate floor surface 72, the second arcuate floor surface 78, and the groove floor surface 80 may define an insert recess floor surface upon which the insert 36 rests and is supported when it is in its installed position as shown in FIGS. 14 and 15, as further discussed below.

In a specific embodiment, as mentioned above, the recess 38 may include the lower relief access 66, which may be disposed beneath the first arcuate recess 60. The function of the lower relief access 66 is to provide access to remove the insert 36 when it fails and needs to be replaced with another insert 36. The ability to remove the worn insert 36 and replace it with a new insert 36 is desirable so that when the insert 36 finally suffers from wear failure, the insert 36 may be removed and a new insert 36 may be installed into the reusable operator housing 14, and that this can be accomplished without any new machining or welding, such as what is required with currently existing solutions to this problem, is also desirable.

In a specific embodiment, a lower portion of the longitudinal groove 17 may be disposed beneath the groove floor surface 80, and may also be vertically aligned with the groove recess 62. In this regard, in this specific embodiment, it is noted that an upper portion of the longitudinal groove 17 has been machined away when the groove recess 62 was machined into the inner bore 16 of the operator housing 14 so that the operator housing 14 may accept assembly of the insert 36. In such instance, this would mean that the operator housing 14 as shown in FIGS. 12-15 was likely made from a refurbished operator housing, i.e., an operator housing in which the trailing edge 19 of the longitudinal groove 17 had previously failed in a manner as discussed hereinabove.

Referring now to FIGS. 14 and 15, the insert 36 is shown disposed in the recess 38 with the lower surface of the insert 36 resting on the insert recess floor surface of the recess 38 and the outer surface of the insert 36 matingly engaged with the inner surface of the recess 38. Note that when the insert 36 is in its inserted position as shown in FIGS. 14 and 15, the lower portion of the longitudinal groove 17 is aligned with the groove 55 and third inner surface 54 in the groove section 44 of the insert 36.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. An insert for an operator housing comprising: an arcuate body member including a first arcuate section, a second arcuate section, and a groove section disposed between the first arcuate section and the second arcuate section, the first arcuate section including a first inner surface defined by a first inner radius R1, and a first outer surface defined by a first outer radius R2, the first arcuate section defining a generally curved wall having a thickness equal to the difference between R1 and R2, the second arcuate section including a second inner surface defined by a second inner radius R4, and a second outer surface having a second outer radius R5, the second arcuate section defining a generally curved wall having a thickness equal to the difference between R4 and R5, and the groove section including a third inner surface defined by a third inner radius R7, the third inner surface defining a concave trough, a left side of the concave trough transitioning into a right side of the first inner surface on the first arcuate section at a first transition, a right side of the concave trough transitioning into a left side of the second inner surface of the second arcuate section, the groove section including a third outer surface defined by a third outer radius R9, the groove section defining a generally curved wall having a thickness equal to the difference between R7 and R9, a left side of the third outer surface transitioning into a right side of the first outer surface on the first arcuate section, and a right side of the third outer surface transitioning into a left side of the second outer surface on the second arcuate section.

2. The insert of claim 1, wherein a first end of the first arcuate section is rounded, and a second end of the second arcuate section is rounded.

3. The insert of claim 1, wherein the operator housing is formed from a ductile iron having a first hardness, and the insert is formed from a tool steel having a second hardness, the second hardness being greater than the first hardness.

4. The insert of claim 1, wherein the insert is formed from a tool steel having a hardness in a range from approximately 40 to 55 HRC.

5. The insert of claim 1, wherein the concave trough is adapted for alignment with a longitudinal groove in an inner bore of the operator housing.

6. The insert of claim 1, wherein the insert is adapted for removable engagement with a recess in an inner bore of the operator housing.

7. An operator housing comprising:

a body member having an internal bore, a recess in the internal bore, and a top flange, the recess including a first arcuate recess, a groove recess, and a second arcuate recess, the first arcuate recess including a first arcuate wall and a first end wall, the first arcuate wall being defined by a radius $R_{10}$ and a first arcuate floor surface, the second arcuate recess including a second arcuate wall and a second end wall, the second arcuate wall being defined by a radius $R_{12}$ and a second arcuate floor surface, the groove recess extending from a groove floor surface of the groove recess to an upper surface of the top flange, and the first arcuate floor surface, the second arcuate floor surface, and the groove floor surface defining an insert recess floor surface.

8. The operator housing of claim 7, wherein the groove recess is a generally vertical, longitudinal concave trough.

9. The operator housing of claim 7, wherein the recess further includes a lower relief access disposed in the internal bore beneath the first arcuate recess.

10. The operator housing of claim 7, wherein a lower portion of a longitudinal groove in the internal bore of the body member is disposed beneath the groove floor surface, and vertically aligned with the groove recess.

11. The operator housing of claim 7, further including an insert having a shape corresponding to a shape of the recess.

12. The insert of claim 11, wherein the operator housing is formed from a ductile iron having a first hardness, and the insert is formed from a tool steel having a second hardness, the second hardness being greater than the first hardness.

13. The insert of claim 11, wherein the insert is formed from a tool steel having a hardness in a range from approximately 40 to 55 HRC.

14. An operator housing comprising:

a body member having an internal bore, a recess in the internal bore, a longitudinal groove in the internal bore, and a top flange, and an insert adapted for mating engagement with the recess, the recess including a first arcuate recess, a groove recess, and a second arcuate recess, the first arcuate recess including a first arcuate wall and a first end wall, the first arcuate wall being defined by a first radius $R_{10}$ and a first arcuate floor surface, the second arcuate recess including a second arcuate wall and a second end wall, the second arcuate wall being defined by a second radius $R_{12}$ and a second arcuate floor surface, the groove recess extending upwardly from a groove floor surface of the groove recess toward the top flange, and the first arcuate floor surface, the second arcuate floor surface, and the groove floor surface defining an insert recess floor surface.

15. The operator housing of claim 14, wherein:

the insert includes a first arcuate section, a second arcuate section, and a groove section disposed between the first arcuate section and the second arcuate section, the first arcuate section being adapted for mating engagement with the first arcuate recess, the second arcuate section being adapted for mating engagement with the second arcuate recess, and the groove section being adapted for mating engagement with the groove recess.

16. The operator housing of claim 15, wherein:

a radius of the first arcuate recess is greater than a radius of the first arcuate section, a radius of the second arcuate recess is greater than a radius of the second arcuate section, and a radius of the groove recess is greater than a radius of the groove section.

17. The operator housing of claim 14, wherein each of the first arcuate wall and the second arcuate wall has a height corresponding to a height of the insert.

18. The operator housing of claim 14, wherein the recess further includes a lower relief access disposed in the internal bore beneath the first arcuate recess.

19. The operator housing of claim 14, wherein a lower portion of the longitudinal groove is disposed beneath the groove floor surface and vertically aligned with the groove recess.

20. The insert of claim 18, wherein the operator housing is formed from a ductile iron having a first hardness, and the insert is formed from a tool steel having a second hardness, the second hardness being greater than the first hardness.

* * * * *